United States Patent

Pauwels et al.

[15] 3,638,831
[45] Feb. 1, 1972

[54] DISPENSING OF HARDENABLE LIQUIDS

[72] Inventors: William A. Pauwels, Southfield, Mich.; Robert G. Nystrom, Glastonbury, Conn.

[73] Assignee: Loctite Corporation, Newington, Conn.

[22] Filed: Mar. 25, 1970

[21] Appl. No.: 22,456

[52] U.S. Cl..................................222/1, 222/195, 222/399
[51] Int. Cl..........................................................B65d 83/00
[58] Field of Search.....................222/1, 394, 396, 397, 399, 222/373, 424, 195; 75/46; 65/329; 266/38

[56] References Cited

UNITED STATES PATENTS 3,395,833  8/1968  Rice..................................222/399 X Primary Examiner—Robert B. Reeves
Assistant Examiner—Francis J. Bartuska
Attorney—Watson, Cole, Grindle & Watson

[57] ABSTRACT

An enclosed vessel for containing a supply of hardenable liquid to be dispensed together with selectively operable pressurizing means for introducing air into the container to exert a superatmospheric pressure on the surface of said liquid, whereby to discharge such liquid from the container into the atmosphere through a discharge line controlled by a dispensing valve and having an intake end submerged within the liquid. There are provided evacuating means operable during discontinuance of the pressurizing operation to evacuate air from the container whereby to withdraw liquid from the discharge line back into the vessel and, optionally, to maintain a reverse flow of air through the discharge line so that the air is introduced into the liquid at a submerged location to thence bubble upwardly through the liquid. In a modified version, the pressurizing air also is introduced into the vessel at a location beneath the surface of the liquid so that it, too, bubbles up through the liquid.

10 Claims, 2 Drawing Figures

PATENTED FEB 1 1972

3,638,831

INVENTORS,
WILLIAM A. PAUWELS
ROBERT G. NYSTROM
BY Watson, Cole, Grindle & Watson
ATTORNEYS

DISPENSING OF HARDENABLE LIQUIDS

BACKGROUND OF THE INVENTION

This invention comprises a process and apparatus for the dispensing of hardenable, flowable materials such as sealants, adhesives, gasketing materials and coatings. (These flowable materials, ranging from true Newtonian liquids to thixotropic and pastelike substances, frequently will be referred to herein as "hardenable liquids"). Modern industry requires improved dispensing devices for liquids of this type, particularly where the devices can be adapted to high-speed production line techniques. This is particularly true in the area of catalyzed or otherwise hardenable adhesives and sealants; compositions of this type increasingly are replacing such conventional materials as mechanical fasteners and preformed nonflowable sealants in production line applications.

For example, many industries today use two-component epoxy adhesives, "RTV" sealants or the technically superior one-component "anaerobic" adhesives and sealants, such as are disclosed in the U.S. Pat Nos. 2,895,950; 3,043,820; 3,046,262 and 3,218,305 to Krieble; and the U.S. Pat. No. 3,435,012 to Nordlander. "Anaerobic" adhesives and sealants are precatalyzed acrylate monomers which remain in the unpolymerized state at room temperature, as long as adequate contact with oxygen is maintained. However, when isolated from oxygen, as when placed between closely fitting metal parts (e.g., in the threads of a mating nut and bolt), the polymerization process (cure) begins and rapidly converts the sealant or adhesive to a hard, durable polymer.

Anaerobic compositions are considered superior to the epoxy adhesives in that the components necessary to promote hardening of the composition may be mixed, and the mixture stored without fear of changes in viscosity or hardening taking place. They are considered superior to the "RTV" sealants in that they can be stored in contact with the atmosphere without concern for gradual hardening taking place. In addition, anaerobic adhesives and sealants do provide reliable and rapid cure at room temperature, initiated by the mere act of confinement.

In view of the lack of satisfactory application equipment, the hardenable liquids such as those discussed above, commonly are brought to the production line in small quantities and hand applied, thus making their use considerably more difficult and expensive than if suitable application equipment were available. One of the major difficulties inherent in the dispensing of hardenable, flowable materials from automatic application equipment is the fact that application conventionally must be to specific, limited locations; hence, the hardenable liquids are dispensed through relatively small nozzles or other such orifices under the control of dispensing valves. To reach the desired location, the liquids generally are pumped to otherwise conveyed through tubes, pipes, etc., to the dispensing orifice. In view of the fact that the liquids are, by their nature, hardenable under certain conditions, the small dispensing openings and the lines and associated valves which carry the hardenable composition to the point of application frequently become blocked, rendering the application device unusable, and causing considerable inconvenience and lost time due to shutdown of the entire production line.

This problem is accentuated by the fact that production lines generally do not run continuously during the day. Rest periods, lunch hours, etc., are taken, and the line frequently is stopped intermittently for minor repairs, adjustments, shift changes, etc. It is inconvenient to clean the flow lines and dispensing nozzles of these devices before each of these temporary shutdowns. However, if not so cleaned, by the time the applicator commences operating again, the hardening of the materials in the lines and the dispensing orifices frequently has proceeded to the point where the applicator has become inoperative.

As a result of the above-described problems, when automatic application devices are used with hardenable liquid compositions, compositions which harden quite slowly are chosen in an effort to prevent blockage of the application equipment. This has had the undesirable effect of greatly increasing the hardening time after the material is placed on the parts to be sealed, bonded, coated, etc., requiring slower production rates and increasing the amount of time for which the parts must be stored to permit adequate hardening to take place. Automatic application devices which avoided these and other problems inherent in the prior art would materially aid the adaption of hardenable liquids such as adhesives, sealants and coatings, to production line techniques, and would be major improvements of great utility.

SUMMARY OF THE INVENTION

With the foregoing considerations in mind, the present invention envisions a process and apparatus for dispensing a hardenable liquid and for treating such liquid in a manner to avoid hardening of the liquid within the apparatus during periods of disuse of the apparatus. Thus, a supply of liquid to be dispensed is housed within an enclosed vessel. Pressurized air or gas introduced into the vessel forces the liquid through a discharge line, preferably under the control of a dispensing valve. When the dispensing operation is discontinued for any substantial period, the pressurizing means is deactivated and in lieu thereof the air or gas is evacuated from the vessel by suitable evacuating means in a manner to withdraw the liquid back through the discharge line into the vessel and, optionally, then maintain a continuing reverse flow of air from the atmosphere through the discharge line in a manner such that the air is introduced into the liquid at a submerged location to bubble up through the liquid in intimate contact with it. In this optional operation, curing or hardening of the above-described anaerobic compositions can be prevented.

In a modified version, the pressurizing air or means also is introduced into the liquid at a submerged location so that it, too, bubbles upwardly through the liquid and serves to prevent the curing thereof. In this form of the invention, in order to maintain a constant flow of pressurizing air upwardly through the liquid, a certain amount of the air or gas is permitted to escape from the vessel as, for instance, through a conventional overpressure release valve.

BRIEF DESCRIPTION OF THE DRAWINGS

To promote an understanding of the invention, reference will now be made to the preferred embodiment together with a modification thereof illustrated in the accompanying drawing, and specific language will be used to describe the same. It will nevertheless be appreciated that no limitation of the scope of the invention is thereby intended, such further modifications and alterations being contemplated as would normally occur to one skilled in the art to which the invention relates.

Thus, in the accompanying drawings.

DETAILED DESCRIPTION

Figure 1:
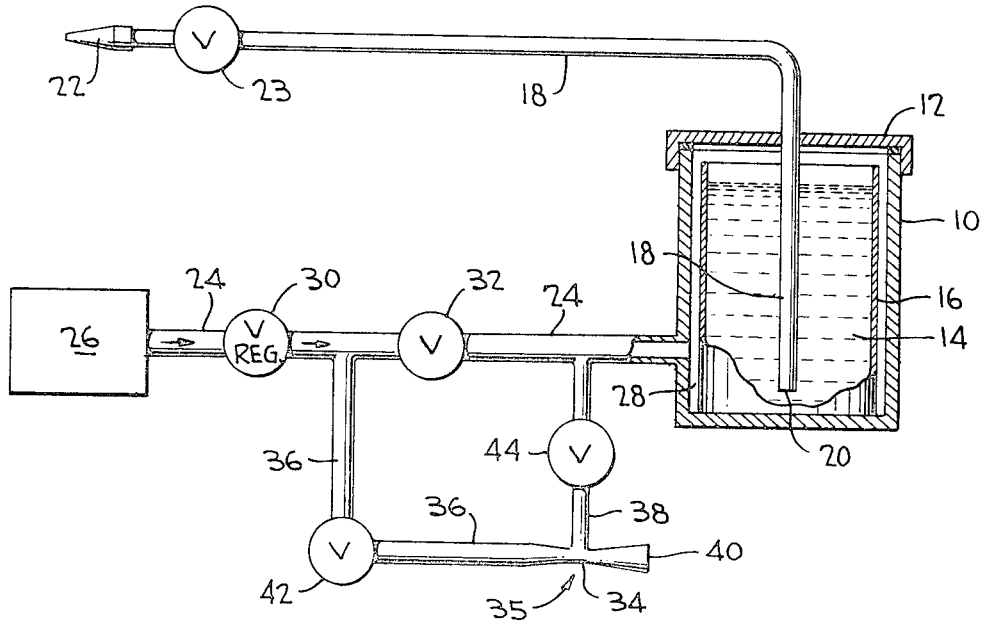
FIG. 1 is a diagrammatic view of the preferred embodiment of the invention.

Referring now in detail to the accompanying drawings, and first considering the apparatus which is illustrated diagrammatically in FIG. 1, this apparatus includes a hermetically sealed vessel 10 of any suitable construction having a removable cover or lid 12 and adapted to contain a supply of the hardenable liquid 14 to be dispensed. The liquid preferably is housed within an inner container 16 which here is shown as resting on the bottom of the vessel 10.

A liquid discharge line 18 extends in sealed relation through the cover or lid 12 and has an intake end 20 submerged in the liquid adjacent the bottom of the container 16 to define a discharge port for the liquid. The discharge line 18 preferably terminates at its outer end in a suitable nozzle 22 defining a discharge orifice and preferably under the control of a conventional valve 23 which may be either manually or automatically operable to permit application of a desired quantity of the hardenable liquid to a workpiece.

Communicating with the interior of the vessel 10 through a supply line 24, is a suitable source 26 of pressurized air. It will be noted that the line 24 extends in sealed relation through a sidewall of the vessel 10 at a location which, in the present instance, is opposite the inner container 16. However, the inner container 16 is spaced from the sidewall of vessel 10 to provide an airspace or a passage 28 so that the inflowing air may rise or pass upwardly into the top of the container and exert a downward pressure on the surface of the liquid 14 within the inner container 16.

The pressure of the inflowing air is normally regulated in the preferred embodiment by a conventional reduction or regulating valve 30 interposed in the supply line 24. For controlling the admission of pressurized air into the vessel 10, a further selectively operable valve 32 is disposed in the supply line 24 between the air pressure regulator 30 and the vessel 10.

The above-described pressurized air source 26 and its associated air supply line 24 constitute a pressurizing means for maintaining a supply of air at super atmospheric pressure within the vessel 10 above the surface of the liquid 14 therein, whereby to discharge the liquid 14 through the discharge line 18 and into the atmosphere through the dispensing nozzle 22 under the control of the dispensing valve 23.

It will be appreciated that in normal operating conditions when the vessel 10 is pressurized for dispensing purposes, the dispensing valve 23 will be intermittently opened to discharge a predetermined amount of the liquid into successive work pieces. In this connection, it will be readily apparent that the work pieces may be successively conveyed past the applicator nozzle 22 at regular time intervals, in which event the dispensing valve 23 may be automatically operated in timed relation to the movement of the work pieces to apply an appropriate amount of liquid to each in succession. For this purpose the valve 23, nozzle 22 and associated operating and control means, therefor, may be constructed and function in the manner disclosed in the U.S. Pat. No. 3,385,261 to Wittemann et al., of May 28, 1968.

When the liquid dispensing function is discontinued for any appreciable period of time, there will be a tendency for the liquid contained within the discharge line 18, dispensing nozzle 22 and valve 23, to cure or harden. In order to prevent such curing during periods of nonuse, it is a particular feature of the present invention to associate evacuating means with the vessel 10 in such a manner as to create and maintain a subatmospheric pressure therein. During the maintenance of such subatmospheric or negative pressure, so long as the dispensing valve 23 is maintained open, there will be created a suction through the supply line 18, causing first a withdrawal of the hardenable liquid in a reverse flow direction backwardly through the nozzle 22, valve 23 and line 18, into the container 16, following which the continued operation of the evacuating means will maintain a reverse flow of air from the atmosphere through the same parts and into the lower portion of the container 16 through the submerged end 20 of the discharge line 18. The air thus entering the liquid 14 beneath this surface will bubble upwardly through the liquid and contact the liquid substantially throughout its depth. When liquid 14 is an anaerobic sealant or other liquid stabilized by contact with air, this flow will retard or prevent its curing within the container 16.

A suitable exemplification of the evacuating means may be as illustrated in FIG. 1, consisting of a conventional aspirator 35 which utilizes a flow of compressed or pressurized air through a constriction 34 in an air bypass line 36 to induce the withdrawal or evacuation of air through lines 24 and evacuation line 38 from the interior of the vessel 10.

It will be noted that the evacuation line 38 communicates with the bypass line 36 at its constriction 34, whereby the flow of pressurized air through the line 36 at constriction 34 will induce a flow of air through evacuation line 38 into the constriction, the air being discharged into the atmosphere through the open end 40 of the bypass line or otherwise disposed of.

In order to render the pressurizing means and the evacuating means selectively and alternately operable, there may be employed suitably located valves such as the valve 32 earlier described, as well as the valve 42, interposed in the bypass line 36, and the valve 44 interposed in the evacuation line 38.

The bypass line 36 communicates with the air supply line 24 at a location between the pressure regulator 30 and the shutoff valve 32 for the supply line. Thus, when the shutoff valve 32 is closed, to discontinue the supply of pressurized air into the vessel 10, if at the same time the bypass valve 42 is opened, the supply of pressurized air will be diverted from the line 24 into and through the bypass line 36 and its constriction 34. Opening of the control valve 44 for the evacuation line 38 will at this time result in an induced withdrawal of air from the vessel 10 through lines 24 and 38 and the constriction 34 to be discharged at 40 with the main or primary airflow through the line 36.

In the overall operation of the apparatus, exemplified in FIG. 1, when it is desired to dispense the hardenable liquid through the dispensing nozzle 22, the valves 42 and 44 are closed to prevent any escape of air from the supply line 24 through lines 36 and 38. At the same time, the valve 32 is opened and air from the pressurized air supply 26 is thus admitted through the supply line 24 to the interior of the vessel 10 where its pressure is imposed upon the surface of the liquid 14. The air, being at superatmospheric pressure, urges the liquid into the intake port 20 at the lower end of the liquid discharge line 18. Opening of the dispensing valve 23 will permit the liquid to flow through the line and be discharged through the nozzle 22 onto a workpiece. Closing of the valve 23 will discontinue the discharge of liquid to nozzle 22. Normally the valve 23 will be intermittently opened to permit application of a predetermined amount of liquid to each of a succession of workpieces moving past the nozzle 22.

When dispensing of the hardenable liquid is to be discontinued for any appreciable period of time, the valve 32 will be closed to discontinue the flow of pressurized air into the vessel 10. Also the waves 42 and 44 will be opened to permit a flow of pressurized air from the line 24 through the bypass line and aspirator 36 and 35, respectively, thus inducing an evacuation of air from the vessel 10 through the lines 24 and 38 and the aspirator 35. After evacuation, dispensing valve 23 will be opened. The resulting creation and maintenance of subatmospheric pressure within the vessel 10 will cause first a backflow of the hardenable liquid through the nozzle 22, dispensing valve 23 and discharge line 18 into the receptacle or container 16, following which there will be maintained a continuous backflow of air from the atmosphere through these same parts and into the liquid 14 through the submerged intake end or port 20 of the discharge line 18. Such air will then bubble upwardly through the liquid en route to the line 24, 38 and the aspirator 35.

Figure 2:
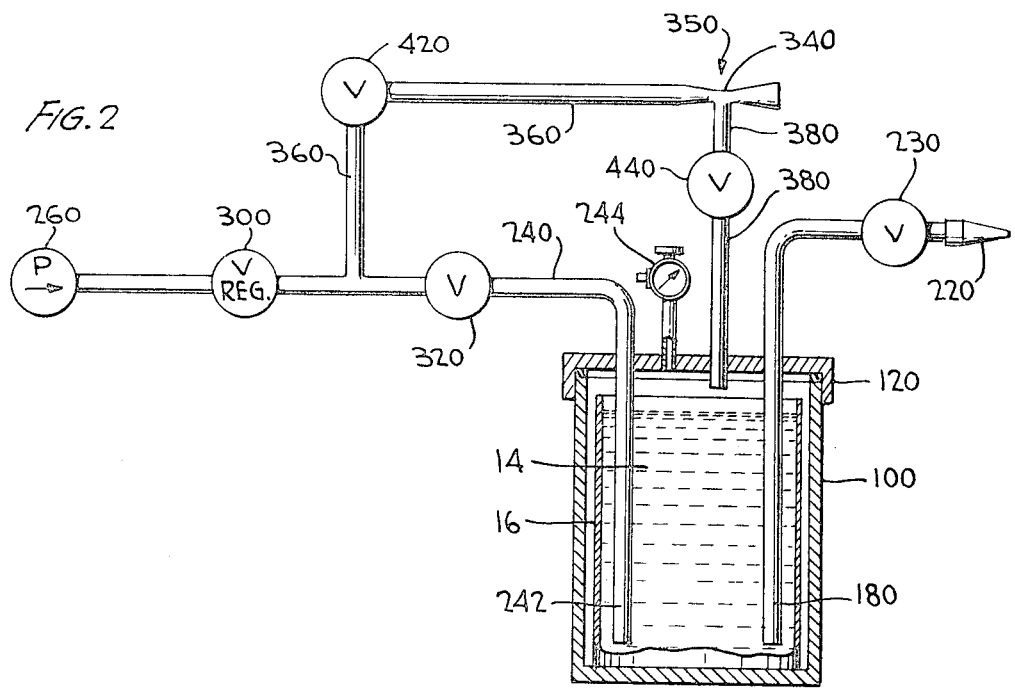
FIG. 2 is a further diagrammatic view of a slightly modified embodiment of the invention.

In the modification illustrated diagrammatically in FIG. 2, the construction and mode of operation are substantially similar to those disclosed in connection with FIG. 1, except that the air delivered into the vessel 100 for the purpose of expelling the liquid 14, is delivered at a location submerged beneath the surface of liquid so that the air bubbles upwardly through the liquid in the same manner and for the same purpose as does the backflowing air through the discharge line when the container and the discharge line are evacuated in the preceding embodiment.

As in the preceding embodiment, the hardenable liquid 14 may be conveniently held within a disposable container 16 which, in turn, is housed within the fluidtight vessel 100 having a removable fluidtight cover 120.

In this embodiment, a flow of air from a suitable source of pressure such as a pump 260 is delivered through a supply line 240 disposed in fluidtight manner through the cover 120 and has its delivery end 242 depending substantially beneath the surface of the liquid to discharge the incoming pressurized air at a location substantially submerged beneath the surface of the liquid and substantially adjacent to the bottom of the container 16. In order that there may be a continuing flow of pressurizing air into the liquid to bubble upwardly therethrough and thus maintain the liquid in contact with the oxygen in the air, the container may conveniently be equipped with a pressure relief valve 244, set to release the air at a pressure which is slightly lower than the pressure of air passing through a pressure regulator 300 interposed in the air supply line 240.

As in the preceding embodiment, a valve 320 is interposed in the supply line 240 between the pressure regulator 300 and the vessel 100 to provide for shutting off the flow of air into the vessel when it is desired to discontinue the dispensing operation.

The bypass line 360 in this arrangement communicates with the supply line 240 of the pressurizing means between the pressure regulator 300 and the valve 320 and itself is controlled by a shutoff valve 420. When the air supply control valve 320 is closed, and the valve 420 is opened, the pressurized air will be caused to flow through the bypass line 360 to and through the constriction 340 of the aspirator 350. Thus a negative pressure or suction is induced through the evacuation line 380 which establishes communication between the constriction 340 of line 360 and the interior of the vessel 100 at a location above the surface of the liquid 14 therein. A valve 440 in the line 380 will normally be closed when the vessel 100 is pressurized to prevent loss of pressure therefrom, but is opened during the evacuation of the vessel to permit air to be drawn upwardly and expelled through the aspirator 350.

As in the first embodiment, the pressurized liquid is discharged through a discharge line 180 having its intake end submerged in the liquid near the bottom of the container 16. The line 180 extends in sealed relation through the container cover 120 and terminates in a dispensing nozzle 220 through which the hardenable liquid is dispensed under the control of a valve 230. The operation of this embodiment is similar to that of the preceding embodiment except that during the dispensing operation, the inflow of pressurizing air through line 240 is injected into the liquid 14 at a submerged location beneath its surface and then bubbles upwardly in a generally constant flow for discharge through the pressure relief valve 244 into the atmosphere. Such movement of air through the liquid inhibits hardening during use of the apparatus. As before, the pressurized liquid is dispensed through the discharge line 180 and nozzle 220 under the control of the valve 230.

When a dispensing operation is discontinued for any appreciable length of time, the flow of air into the liquid is discontinued by shutting off the valve 320. The alternatively operable evacuating means is then rendered operative by opening the valve 420 to permit diversion of the pressurized air from the line 240 through the line 360. At the same time, the normally closed valve 440 is opened so that the air may be evacuated from the vessel 100 through the line 380 and constriction 340 of the aspirator for discharge into the atmosphere.

So long as the evacuating means is thus operated, the dispensing valve 230 of the discharge line 180 is maintained open. Thus, there is produced a backflow of the liquid from the nozzle 220, valve 230 and line 180 into the container, following which there is a continuing backflow of atmospheric air through these same ports and into the container to again produce a flow of air upwardly through the hardenable liquid 14. When liquid 14 is stabilized by the presence of air, this flow will prevent the liquid from curing or hardening, pending resumption of the dispensing operation.

As has been explained above, the dispensing devices described herein are particularly adaptable to use with anaerobic compositions and extremely important benefits can be obtained thereby. Such use of these devices makes available a process for applying anaerobic compositions which clearly is superior to prior art processes. As explained above, anaerobic compositions are mixtures of a polymerizable acrylate ester and a hydroperoxide catalyst therefor, which harden by a polymerization process which is inhibited by the presence of oxygen. As long as the pressure within the sealed vessel is maintained by compressed gasses, at least a portion of which is oxygen, the hardening reaction is eliminated or inhibited sufficiently to make the anaerobic sealants and adhesives particularly adaptable to use in the devices disclosed herein. Since the polymerization does not take place to any significant extent, the viscosity of the anaerobic composition remains substantially constant, thus making the dispensing of uniform quantities of the anaerobic composition relatively easy.

Having thus described the invention, we claim:

1. Apparatus for dispensing a hardenable liquid which comprises: a fluidtight vessel having therein a supply of said liquid to be dispensed, said liquid having an upper surface exposed to the pressure of gas within the vessel; at least one discharge line for conveying the liquid from the vessel to a point of discharge externally of the vessel, said discharge line having an intake end within the vessel submerged in the liquid; selectively operable means for introducing gas into the vessel at a sufficient pressure to discharge the liquid from the vessel through said discharge line; and a cleaning system, including means for discontinuing the introduction of gas into the vessel and means for causing a backflow of atmospheric air completely through said line to its intake end.

2. Apparatus as defined in claim 1, wherein said last mentioned means evacuates air from said vessel to withdraw the liquid from said discharge line back into the vessel.

3. Apparatus as defined in claim 1, including valve means associated with said discharge line for controlling the discharge of liquid therethrough.

4. Apparatus for dispensing a hardenable liquid which comprises: a fluidtight vessel having therein a supply of said liquid to be dispensed, said liquid having an upper surface exposed to the pressure of gas within the vessel; at least one discharge line for conveying the liquid from the vessel to a point of discharge externally of the vessel, said discharge line having an intake end within the vessel submerged in the liquid, selectively operable means for introducing gas into the vessel at a sufficient pressure to discharge the liquid from the vessel through said discharge line; and a cleaning system, including means for discontinuing the introduction of gas into the vessel and means for causing a backflow of liquid and atmospheric air through said line, said last mentioned means comprising evacuating means communicating with the vessel and applying a subatmospheric pressure to the surface of the liquid whereby to cause a backflow of fluid through said line into the vessel and thereafter to produce a backflow of atmospheric air through the line and through the submerged intake end of the said discharge line, whereby to produce a bubbling of air upwardly through the liquid.

5. Apparatus as defined in claim 4, wherein said evacuating means comprises an aspirator, means for supplying a primary flow of pressurized air through said aspirator, and an evacuation line extending from said vessel through the aspirator and in aspirating relation to said primary airflow.

6. Apparatus for dispensing a hardenable liquid comprising a hermetically sealed vessel for containing a supply of the liquid to be dispensed; a discharge line extending between the interior of said vessel and the atmosphere and having an intake end communicating with the interior of said vessel at a location substantially below the level of said liquid; selectively operable pressurizing means for maintaining a supply of air at superatmospheric pressure within said vessel above the surface of said liquid, whereby to discharge said liquid from the vessel into the atmosphere; means for discontinuing said pressurized air supply, and evacuating means operable during discontinuance of said air supply to evacuate air from the vessel whereby to withdraw liquid from said discharge line back into the vessel and then to maintain a reverse flow of air from the atmosphere through said discharge line upwardly through the liquid.

7. Apparatus as defined in claim 6, wherein said pressurizing means includes an air supply line having a delivery end communicating with the vessel at a location submerged in the liquid substantially below the upper surface thereof, whereby the inflowing air bubbles upwardly through the liquid; said evacuating means including an evacuation line having an intake end in communication with the interior of the vessel.

8. Apparatus as defined in claim 7, including a dispensing valve for controlling the passage of liquid through said discharge line.

9. The process of dispensing an anaerobic liquid from a completely enclosed and sealed container through a discharge line leading from said container to the atmosphere and having an intake port within the container below the level of said liquid, comprising the steps of introducing air at superatmospheric pressure into said container above the liquid to discharge the said liquid through the discharge line; discontinuing said supply of air; then evacuating the air from above said liquid to maintain a subatmospheric pressure within the container, thus sucking the liquid back through the line into the container and thereafter maintaining an influx of atmospheric air into the container below the liquid level to bubble upwardly through the liquid, whereby to prevent curing of the anaerobic liquid.

10. The process defined in claim 9, including the step of introducing the superatmospheric air into the container at a location submerged in the liquid, thereby causing said air to bubble upwardly through the liquid to prevent curing of the latter.

* * * * *